United States Patent [19]

Renfro, Jr.

[11] Patent Number: 5,059,252

[45] Date of Patent: Oct. 22, 1991

[54] METHOD FOR ENHANCING BIOREMEDIATION OF HYDROCARBON CONTAMINATED SOILS

[75] Inventor: Arthur E. Renfro, Jr., Atascadero, Calif.

[73] Assignee: Advanced Environmental Technologies, Inc., Atascadero, Calif.

[21] Appl. No.: 448,937

[22] Filed: Dec. 12, 1989

[51] Int. Cl.$^5$ .............................................. B08B 7/00
[52] U.S. Cl. .............................. 134/7; 423/DIG. 20; 210/922; 210/925; 435/281; 106/900
[58] Field of Search ................... 134/7; 423/DIG. 20; 210/922, 925; 435/281; 106/900

[56] References Cited

U.S. PATENT DOCUMENTS

| | | | |
|---|---|---|---|
| 3,634,192 | 1/1972 | Brillaud | 435/146 |
| 4,850,745 | 7/1989 | Hater et al. | 405/128 |
| 4,925,802 | 5/1990 | Nelson et al. | 210/611 |
| 4,983,299 | 1/1991 | Lupton et al. | 210/909 |
| 4,992,174 | 2/1991 | Caplan et al. | 210/901 |

OTHER PUBLICATIONS

"Innovative Techniques for the Bioremediation of Contaminated Soils", dated Jun. 7, 1988, Mathewson, Grubbs, and Molnaa.

*Primary Examiner*—Theodore Morris
*Assistant Examiner*—Zeinab El-Arini
*Attorney, Agent, or Firm*—Barnes & Thornburg

[57] ABSTRACT

A method for on-site bioremediation of soils contaminated with petroleum derived hazardous wastes is described. This method for enhancing bioremediation includes the step of applying a cationic ion exchange resin to the contaminated soil in an amount sufficient to promote growth of organisms capable of degrading the hazardous waste.

23 Claims, No Drawings

METHOD FOR ENHANCING BIOREMEDIATION OF HYDROCARBON CONTAMINATED SOILS

BACKGROUND OF THE INVENTION

This invention relates to a method for enhancing bioremediation of hydrocarbon contaminated soils. More particularly, a method of mixing cationic ion exchange resins with hydrocarbon contaminated soils to promote growth of organisms capable of degrading alkanes and other petroleum derived hydrocarbons is described.

Hydrocarbons such as crude petroleum and petroleum derived products can be characterized as a complex mixture of of straight and branched alkanes or alkenes, saturated ring compounds, and aromatic compounds. Small amounts of sulfur, nitrogen, or oxygen are also covalently attached to these various hydrocarbon chains. Gasoline, kerosene, burner fuel oil, diesel oil, gas turbine oil, and aviation fuel are examples of petroleum derived fuel oils, distillates, or catalytically processed petroleum fractions widely used by industry because of their relative low cost, stability and high heat value resulting from burning with oxygen. However, this widespread use has a concomitantly associated environmental cost related to contamination of soils resulting from spillage, seepage, or accidental release of petroleum derived hydrocarbons.

In the past, a generally accepted procedure for controlling possible environmental damage of hydrocarbon contaminated soil involved permanent removal of the contaminated soil to a secure landfill. However, given the decreasing availability of landfills willing to accept hazardous wastes, the high cost of transport and removal of soil from a hydrocarbon contaminated sites, and the potential liability exposure associated with off-site transport and disposal, landfill disposal of hydrocarbon contaminated soil is becoming an increasingly unattractive means for handling hydrocarbon contaminated soils.

An alternative procedure for reducing the amount of hydrocarbon contamination of soils is known as bioremediation. Bioremediation relies on the hydrocarbon degrading abilities of biologic materials such as bacteria, saprophytes, bacterial enzymes, or saprophytic enzymes to degrade contaminated soils. The hydrocarbon degrading biologic materials are often naturally present in contaminated soils, and given sufficient time can naturally degrade the hydrocarbon contaminants. However, this natural degradation process can often be promoted by directly adding biologic materials to soil in an amount sufficient to degrade the hydrocarbons, or by encouraging the proliferation of hydrocarbon degrading organisms, either naturally present in soil or present as a result of inoculation. Proliferation of hydrocarbon degrading organisms can also be encouraged by the addition of nutrients to soil or by adjusting the soil conditions to favor growth of the desired organisms.

Bioremediation of hydrocarbon contaminated soils is favored over soil removal or chemical treatment of soil because of the lower cost, proven effectiveness, and ability for on site reduction of hydrocarbon contamination. However, these advantages can be outweighed by the substantial length of time necessary for bioremediation. Even under optimum conditions, months or years may be required to reduce the levels of hydrocarbon contamination of soils to a desired level. This disadvantage has greatly limited the potential use of bioremediation to reduce hydrocarbon contamination of soils.

It is therefore an object of this invention to reduce the levels of hydrocarbon contamination of soils by promoting the growth of organisms capable of degrading hydrocarbons contaminating the soil.

It is a further object of this invention to alter the chemical properties of hydrocarbon contaminated soil to promote the proliferation of bacteria and other organisms capable of degrading hydrocarbon contaminants.

Yet another object of this invention is to increase the acidity of soil to promote the proliferation of bacteria and other organisms capable of degrading hydrocarbon contaminants.

Still another object of this invention is to reduce the time required to degrade hydrocarbon contaminants to acceptable levels.

A further object of this invention is to provide a method for application of an inexpensive composition to hydrocarbon contaminated soil to promote cost effective onsite bioremediation.

SUMMARY OF THE INVENTION

In accordance with the foregoing objectives, a method for enhancing bioremediation of hydrocarbon contaminated soils is provided. A composition including a cationic ion exchange resin is thoroughly mixed with hydrocarbon contaminated soil. The amount of cationic ion exchange resin mixed is preferably equivalent to between about $1.0 \times 10^{-4}\%$ and $1.0 \times 10^{-8}\%$ by dry weight of hydrocarbon contaminated soil to be treated. More preferably between about $1.0 \times 10^{-5}\%$ and $1.0 \times 10^{-7}\%$ by dry weight of soil of cationic ion exchange resin is mixed with soil, and most preferably about $1.0 \times 10^{-6}\%$ by dry weight of the composition is mixed with soil. The mixture of contaminated soil and cationic ion exchange resin containing composition is allowed to stand for a length of time sufficent to reduce to acceptable levels the amount of hydrocarbon contaminants present in the soil.

In preferred embodiments the composition to be mixed with hydrocarbon contaminated soils further contains napthalene or other cyclic ring hydrocarbons covalently linked to a mineral acid such as sulfonic acid. The composition can also include other mineral acids such as sulfuric, hydrochloric, or industrially derived impure mixtures of mineral acids.

In more preferred embodiments the cationic ion exchange resin is a polymeric material covalently coupled to sulphonic acid and having a gel or macroreticular structure upon hydration. The polymeric material can optionally include electron withdrawing substituents to stabilize the polymeric material. In a most preferred embodiment the cationic exchange resin is poisoned or spent heterogenous cationic ion exchange resin used as an acid catalyst in a chemical reactor prior to incorporation into the composition of the present invention To facilitate distribution of the foregoing composition through hydrocarbon contaminated soil, the composition is mixed with water prior to mixing with hydrocarbon contaminated soil. A water/composition mixture that includes between about 2.5% and 0.025% composition by volume in a preferred embodiment, between about 1% and 0.1% composition by volume is a more preferred embodiment, and about 0.25% composition by volume in a most preferred embodiment, is thoroughly mixed with hydrocarbon contaminated soil to enhance the rate of bioremediation.

A major advantage of the present invention is the ability to reduce levels of hydrocarbon contamination at the site of the contamination. Bioremediation of hydrocarbon contaminated soil can be enhanced simply by mixing the foregoing compound with hydrocarbon contaminated soil at the site of contamination by mechanical tillage or other recognized device for breaking, mixing, and overturning soil. Costly transport or processing of hydrocarbon contaminated soil is not necessary, and since the bioremediation process can be accomplished on-site the legal problems associated with transport of hazardous wastes to hazardous waste processing sites can be completely avoided.

A further advantage of the present method is its ability to be employed in conjunction with other art recognized bioremediation processes. Adding the foregoing composition to hydrocarbon contaminated soil can be one component of an extensive bioremediation process that could include the addition of organic matter, conditioners, stabilizers, or other compounds to promote or stabilize the aggregation of soil particles and therefore increase or stabilize the porosity, permeability, water-holding capacity and aeration of the hydrocarbon contaminated soils. Mixing the foregoing composition with hydrocarbon contaminated soils can not only be used in conjunction with soil processing methods that act on the physical state of the soil (aggregation, pH control, salinity reduction etc.), but is also useful for enhancing the speed of bioremediation when used in conjunction with additives primarily directed to promoting the growth of hydrocarbon degrading organisms. For instance, the foregoing composition can be used as part of a bioremediation program that includes the application of an inoculum of biodegrading organisms, or small amounts of oxygenators, fertilizers, nutrients, or enzymes that enhance the growth of hydrocarbon degrading organisms and therefore speed the bioremediation process.

Yet another advantage of the present invention is the relatively small amounts and low cost of materials necessary for enhancing bioremediation of hydrocarbon contaminated soils. The low overall cost and widespread availability of the foregoing composition is a key element in its use for enhancing the bioremediation of the large volume of hydrocarbon contaminated soil presently extant. Cationic ion exchange resins are widely available because of their use by the petroleum industry as acid catalysts. Poisoned or spent catalyst unsuitable for further use in chemical reactors are suitable for use in the method of the present invention. Sulfuric or other mineral acids are also widely available at low cost, as are acid substituted naphthalenes.

Additional objects, features, and advantages of the invention will become apparent to those skilled in the art upon consideration of the following detailed description of preferred embodiments exemplifying the best mode of carrying out the invention as presently perceived.

DETAILED DESCRIPTION OF THE INVENTION

Many types of contaminants can be removed from essentially inert materials such as soil, sand, sludge, filter cakes, fine gravels, silts, etc., in accordance with the present invention. While it is not possible to list every conceivable contaminant that can be treated with cationic ion exchange resins in the manner of the present invention, the process according to the present invention is expected to best promote biodegradation of a wide range of petroleum derived and other long carbon chain organic chemicals. Best results are expected with non-aromatic contaminants and with contaminants having greater than seven carbon members, but an enhancement of biodegradation is expected even with volatiles and aromatic compounds given the presence of appropriate biodegrading organisms.

Preferably the method according to the present invention is utilized to enhance bioremediation of soil or other inert material that are contaminated with petroleum derived fuel oils such as gasoline, kerosene, burner fuel oil, diesel oil, gas turbine oil, or aviation fuel. Other contaminants may include paraffins (alkanes), olefins (alkenes), lubricants, greases, paint driers, engine oil additives, naphthenic acids, alkyl acids such as alkylphenols and cresylic acids, fats and fatty acids, and other hydrocarbons that may or may not be derived from petroleum. Fuel oil contaminants are generally composed of a range of unbranched or branched alkanes having carbon skeletons that range in size from C-5 to C-20, with the majority of the contaminants ranging in size from C-12 to C-17. Generally, the light volatile fractions having 7 or less carbon atoms are not retained by soil or sand and are easily evaporated prior to initiation of the method of the present invention to enhance bioremediation.

Reducing the levels of the foregoing contaminants in soils by enhancing biodegradation of the contaminants can be effected with a wide range of cationic resins. Cationic resins suitable for the use in a composition to be mixed with hydrocarbon contaminated soils to enhance the bioremediation process can include cross linked polymers in the form of gel, macroreticular beads or sheets, or water soluble resins formed either synthetically or prepared from naturally occurring organic polymers such as cellulose or hemicellulose. If prepared synthetically, essentially any monomer can be lightly crosslinked with a polyfunctional linking polymer to form a suitable synthetic resin. Commonly used monomers that are commercially available and are suitable for use in the composition of the present invention include styrene, acrylonitrile, acrylate esters, and methacrylate esters. These monomers are crosslinked with a polyfunctional linking reagent such as divinylbenzene to form the desired polymer To form a suitable cationic exchange resin the polymers must be functionalized with an appropriate acid functional group. Functionalization of the polymer is generally initiated after polymer formation, but covalent attachment of an acid group to the polymer can also be initiated during the polymerization process if desired. For the purpose of the present invention, functionalization of the polymers with a Bronsted-Lowry acid capable of donating a proton is preferred over functionalization with Lewis acids such as boron trifluoride or aluminum trichloride. Preferably, a mineral acid such as sulphonic acid is covalently attached to the crosslinked polymer to form a functional group capable of donating a proton in solution.

Cationic functionalized polymeric resins suitable for use in the present invention act as acidulating agents, promoting the formation of hydronium ions when placed in an aqueous solution. Mixture of a composition including cationic polymers with hydrocarbon contaminated soil has the effect of changing soil chemistry by lowering the PH of hydrocarbon contaminated soils. Acid soils are made more acid following mixture with cationic resins, and basic soils are neutralized or made less basic. Since acidic soils favor the growth of hydrocarbon degrading bacteria, reducing the pH of the soil acts to enhance bioremediation. This pH reducing effect can be further enhanced by including other acidulating agents. For instance mineral acids such as sulfuric acid and cyclic ring hydrocarbons such as napthalene substituted with sulphonic acid can also be included in the composition to be mixed with hydrocarbon contaminated soil.

Application of the compositions of the present invention to hydrocarbon contaminated soil is generally accomplished by first pouring a mixture of a foregoing composition and water onto hydrocarbon contaminated soil. The soil is then physically manipulated by mechanical or manual tillage to thoroughly mix the composition with the soil. Tillage has the additional advantage of promoting aeration of of the soil, thus favoring the growth of aerobic hydrocarbon degrading bacteria. If required, loose or friable hydrocarbon contaminated soils can be treated with art recognized soil amenitives to improve the porosity, permeability, or other soil properties that would favor mixing the cationic exchange resins with the soil.

Maximizing the effectiveness of the bioremediation process also requires attention to the water content of the hydrocarbon contaminated soil. Since growth of hydrocarbon degrading aerobic bacteria occurs best under the same conditions that favor plant growth, the soil being treated should be kept at a moisture content between the wilting percentage and the maximum water retentive capacity of the hydrocarbon contaminated soil. The desired moisture content will of course vary with soil type, but can be determined by those skilled in the art of evaluating soil conditions.

In a practical method according to the present invention, contaminated soil can be containerized, spread on an impermeable sheet of material such as a plastic liner, or treated on-site without removal of the contaminated soil. For example, an impermeable sheet of material can be situated at a desired location, and the soil can be distributed atop the sheet to form an even layer of soil between 12 and 18 inches deep. The soil is then mixed, disked, or tilled to loosen and aerate the contaminated soil. The water/composition mixture containing about 0.25% of the composition is then added to the contaminated soil so that an amount of cationic ion exchange resin equivalent to about $1.0 \times 10^{-6}$ by dry weight of the soil to be treated is mixed with the soil. As desired a larger percentage of the composition can be used in the initial water/composition mixture and a spraying system, sprinklers, or other suitable water supplying means can be used to add additional water to the treated contaminated soil. The optimum moisture content of the treated contaminated soil for the present process depends upon the type of soil which is contaminated, but should be less than the maximum water retentive capacity (saturation level) of the soil to prevent water runoff that could spread the hydrocarbon contaminants. Maintaining a minimum moisture content of at least 80% of the saturation level of the soil is desired.

After the water/composition mixture is added to the soil, the soil is again mixed, disked, or tilled to increase the percentage of the total volume of the contaminated soil that comes into contact with the water/composition mixture. The soil treated with the water/composition mixture of the present invention is then left undisturbed. As discussed above, the moisture content of the soil should be monitored and adjusted so that the level remains above the wilting percentage and below the saturation level (corresponding to the maximum water retention capacity) of the soil. Water or an additional treatment of the water/composition mixture should be added if the moisture content of the soil drops below this desired level. With each application of the mixture, the soil may be mixed, disked, or tilled. This process is continued until the level of hydrocarbon contamination in the soil drops to acceptable levels. The soil can be tested at periodic intervals to measure the level of hydrocarbons remaining in the soil. This periodic testing should be done at least monthly and provides an indication of whether or not additional treatments of the mixture to the soil are necessary to reduce the level of hydrocarbons below the maximum acceptable level. It may also be necessary to apply fertilizer or enzymes to small sections of the soil which have substantially higher contamination levels to reduce hydrocarbon levels within a desired time period.

The following examples are presented to further illustrate use and operation of the present invention.

EXAMPLE 1

Hydrocarbon contaminated soil at a San Bernardino, Calif., site was treated according to the method of the present invention to reduce hydrocarbon contamination to levels acceptable for reuse on-site, disposal as a nonhazardous waste, or disposal as low level hazardous waste. Approximately 45 cubic yards of soil from the San Bernardino plot was relocated to an onsite test plot. The hydrocarbon contaminated soil was evenly spread over a 28 by 60 foot test plot labelled the Phase I test plot and divided into 20 equal volume sections for sampling purposes. The Phase I test plot was located in an area isolated from storm water runoff and remained covered during the bioremediation process. The cover was removed only to till or rotate the soil or to add a treatment composition that consisted of a mixture of cationic ion exchange resins, napthalene sulfonic acid and sulfuric acid available under the tradename "Condor LR" and available from Earth Science Products, Corp, Portland, Oreg. This composition was diluted with 400 parts water to 1 part composition prior to application to the test plot and the dry weight of the cationic ion exchange resin was about $1.0 \times 10^6$% of the soil weight. Accordingly, the amount of Condor LR applied was about 30 gallons per acre of the test plot.

The 45 cubic yards of soil in the Phase I test plot was contaminated primarily with diesel fuel, and comprised a portion of about 345 cubic yards of soil having hydrocarbon levels sufficiently elevated to require disposal at a Class III waste disposal site. The tested levels of organic lead, benzene, toluene, ethylbenzene, and xylenes were negligible.

Test samples were derived from the Phase I test plot in the following manner. A random number table is used to select 5 squares from the 20 marked equal volume sections of the test plot. Equal aliquots of soil from approximately the same depth were obtained from each of the 5 squares and thoroughly mixed in a container to create a homogenous mixture. A sample of sufficient quantity for analysis was obtained from this mixture and labeled as a composite sample. The foregoing procedure was repeated twice more so that a total of three composite samples are drawn from the Phase I test plot on each sampling date. All testing of samples was done in accordance with applicable state and federal guidelines in approved testing laboratories. Analysis of total petroleum hydrocarbons (Diesel) was done in accordance with the guidelines set forth in EPA Method 8015. The method for testing soil pH was done following the procedure set forth in EPA Method 9045, and the procedure for testing microbial population of the soil was completed following EPA Method 907A, Standard Plate Count.

Results from a bioremediation program begun 8/15/89 during which weekly composite samples from the Phase I test plot were taken are presented below in Table 1.

TABLE 1

| Sample | Date | Diesel (ppm) | CFU/gm × $10^6$ | pH |
|---|---|---|---|---|
| 1 | 8/15/89 | 4400 | 197 | 8.5 |
| 2 | 8/15/89 | 4200 | 176 | 8.5 |
| 3 | 8/15/89 | 3900 | 141 | 8.4 |
| 4 | 8/22/89 | 330 | 176 | 8.4 |
| 5 | 8/22/89 | 2100 | 195 | 8.4 |
| 6 | 8/22/89 | 700 | 124 | 8.3 |
| 7 | 8/30/89 | 2400 | 7,200 | 8.3 |
| 8 | 8/30/89 | 2700 | 2,740 | 8.2 |
| 9 | 8/30/89 | 2000 | 1,970 | 8.3 |
| 10 | 9/15/89 | 2700 | 12,300 | 8.1 |
| 11 | 9/15/89 | 450 | 18,300 | 8.1 |
| 12 | 9/15/89 | 660 | 6,600 | 8.1 |
| 13 | 9/25/89 | 2900 | 114 | 8.4 |
| 14 | 9/25/89 | 1700 | 110 | 8.4 |
| 15 | 9/25/89 | 2000 | 47 | — |

As demonstrated by Table 1, the microbial population greatly increased over the course of the bioremediation process and the pH and the levels of hydrocarbon contamination decreased.

EXAMPLE 2

A bioremediation program situated adjacent to the Phase I test plot and known as "Phase II" was also used to reduce levels of hydrocarbon contamination of approximately 300 cubic yards of soil derived from the same source as the Phase I hydrocarbon contaminated soil. The Phase II test plot was divided into approximately 6 equal 50 cubic yard plots adjacently situated. The level of hydrocarbon contaminants in each of the 6 plots prior to initiation of the enhanced bioremediation process according to the present invention was considered to be equivalent to the levels tested in the Phase I test plot.

The same composition as described in Example 1 was applied following the same procedures to 300 cubic yards of the Phase II test plot. As the following Table 2 of test results derived from samples taken from each of the 6 plots on differing dates over the course of the bioremediation procedure illustrates, the microbial population increased, the pH decreased, and the levels of contaminant hydrocarbons greatly decreased in a relatively short period of time.

TABLE 2

| Sample | Date | Diesel (ppm) | CFU/gm × $10^5$ | pH |
|---|---|---|---|---|
| 1 | 9/7/89 | 270 | 84 | 8.4 |
| 2 | 9/7/89 | 5700 | 424 | 8.3 |
| 3 | 9/7/89 | 10000 | 4340 | 8.7 |
| 4 | 9/7/89 | 1300 | 118 | 8.4 |
| 5 | 9/7/89 | 3200 | 90 | 8.3 |
| 6 | 9/7/89 | 1500 | 218 | 8.3 |
| 1 | 9/15/89 | 140 | 600 | 8.2 |
| 2 | 9/15/89 | 810 | 19,400 | 8.1 |
| 3 | 9/15/89 | 8000 | 830 | 8.4 |
| 4 | 9/15/89 | 610 | 8,800 | 8.2 |
| 5 | 9/15/89 | 670 | 10,400 | 8.2 |
| 6 | 9/15/89 | 700 | 63,000 | 8.2 |
| 1 | 9/25/89 | 150 | 820 | 8.5 |
| 2 | 9/25/89 | 1700 | 1,900 | 8.3 |
| 3 | 9/25/89 | 880 | 2,800,000 | 7.6 |
| 4 | 9/25/89 | 560 | 280,000 | 8.2 |
| 5 | 9/25/89 | 2300 | 1,400 | 8.4 |
| 6 | 9/25/89 | 1100 | 1,800 | 8.4 |

It should be noted that plots 3 and 4 were treated on 9/21/89 with fungally derived enzymes to speed the bioremediation process. This preparation is commercially available under the tradename "Advanced Biocultures Formulations L-104" and is produced by Solmar Corp.

Although the invention has been described in detail with reference to certain preferred embodiments and specific examples, variations and modifications exist within the scope and spirit of the invention as described and as defined in the following claims.

I claim:

1. A method for enhancing bioremediation of hydrocarbon contaminated soils comprising the step of mixing a cationic ion exchange resin with hydrocarbon contaminated soil.

2. The method of claim 1 wherein the cationic ion exchange resin is covalently coupled to sulphonic acid.

3. The method of claim 2 wherein sulphonated cyclic ring hydrocarbons are concurrently mixed with hydrocarbon contaminated soil.

4. The method of claim 3 wherein a mineral acid is concurrently mixed with hydrocarbon contaminated soil.

5. The method of claim 4 wherein the mineral acid concurrently mixed with hydrocarbon contaminated soil is sulfuric acid.

6. The method of claim 1 further including the additional step of mixing water with the cationic ion exchange resin.

7. The method of claim 6 wherein between about 1.0% and 0.1% by volume of the mixture is cationic ion exchange resin.

8. The method of claim 6 wherein between about 2.5% and 0.025% by volume of the mixture is cationic exchange resin.

9. The method of claim 6 wherein 0.25% by volume of the mixture is cationic ion exchange resin.

10. A method for enhancing bioremediation of hydrocarbon contaminated soils comprising the steps of
combining a cationic ion exchange resin, a cationic substituted napthalene, and a mineral acid to form an acid composition; and
mixing the acid composition with hydrocarbon contaminated soil.

11. A method for enhancing bioremediation of hydrocarbon contaminated soils having a definite water saturation level and a wilting percentage level comprising the steps of
mixing water with a cationic ion exchange resin to provide a water/resin mixture having between about 2.5% and 0.025% of the resin by volume,
applying the mixture to an area of soil contaminated with an undesirable level of hydrocarbons, mixing the contaminated soil treated with the mixture to increase the percentage of the total surface area of the soil contacted by the mixture, and testing the soil periodically to monitor reduction in the amount of hydrocarbon contaminants contained in the soil.

12. The method of claim 11, further comprising the step of:

maintaining the moisture content in the contaminated soil between about the wilting percentage level and the saturation level of the treated soil.

13. The method of claim 11, wherein the water/resin mixture contains about 0.25% or the composition by volume.

14. The method of claim 11, wherein the resin composition further contains cyclic ring hydrocarbons covalently linked to a mineral acid.

15. The method of claim 14, wherein the mineral acid comprises sulfonic acid and the cyclic ring hydrocarbon comprises napthalene.

16. The method of claim 11, wherein the cationic ion exchange resin comprises a polymeric material covalently coupled to sulfonic acid and having a macroreticular structure upon hydration.

17. A method for enhancing bioremediation of hydrocarbon contaminated soils comprising the steps of:

placing soil contaminated with an undesirable level of hydrocarbons onto an impermeable sheet of material, tilling the contaminated soil to loosen and aerate the contaminated soil, mixing water with a composition containing a cationic ion exchange resin to provide a water/composition mixture, applying the mixture to the contaminated soil placed on the impermeable sheet of material, remixing the contaminated soil after the soil has been treated with the water/composition mixture, and monitoring the moisture content of the contaminated soil between about the wilting percentage and the maximum water retentive capacity of the soil during the bioremediation process.

18. The method of claim 17, wherein between about 12 inches and 18 inches of the contaminated soil is placed upon an impermeable sheet.

19. The method of claim 17, wherein the water/composition mixture contains between about 2.5% and 0.025% of the composition by volume.

20. The method of claim 17, wherein the desired moisture level is at least 80% of the water retention capacity of the contaminated soil.

21. The method of claim 17, wherein the composition further contains cyclic ring hydrocarbons covalently linked to a mineral acid.

22. The method of claim 21, wherein the mineral acid comprises sulfonic acid and the cyclic ring hydrocarbon comprises napthalene.

23. The method of claim 7, wherein the cationic ion exchange resin comprises a polymeric material covalently coupled to sulfonic acid and having a macroreticular structure upon hydration.

* * * * *